United States Patent
Vajo et al.

(10) Patent No.: US 7,521,036 B2
(45) Date of Patent: Apr. 21, 2009

(54) HYDROGEN STORAGE MATERIALS AND METHODS INCLUDING HYDRIDES AND HYDROXIDES

(75) Inventors: John J Vajo, Westhills, CA (US); Florian O Mertens, Birmingham, MI (US); Scott W Jorgensen, Bloomfield Township, MI (US)

(73) Assignee: General Motors Corporation, Detroit, MI (US)

(*) Notice: Subject to any disclaimer, the term of this patent is extended or adjusted under 35 U.S.C. 154(b) by 299 days.

(21) Appl. No.: 10/787,292

(22) Filed: Feb. 26, 2004

(65) Prior Publication Data

US 2005/0191232 A1    Sep. 1, 2005

(51) Int. Cl.
- C01B 3/02 (2006.01)
- C01B 6/00 (2006.01)
- C01B 6/02 (2006.01)
- C01B 6/04 (2006.01)
- C01B 6/06 (2006.01)
- C01B 6/26 (2006.01)

(52) U.S. Cl. .................. 423/644; 423/645; 423/646; 423/647; 423/648.1; 423/658.2

(58) Field of Classification Search .............. 423/644, 423/645, 646, 647, 648.1, 658.2
See application file for complete search history.

(56) References Cited

U.S. PATENT DOCUMENTS

| | | | |
|---|---|---|---|
| 3,405,068 A | 10/1968 | Hiltz | |
| 3,607,051 A * | 9/1971 | Plesek et al. | 23/313 R |
| 4,555,395 A * | 11/1985 | Sirovich et al. | 423/644 |
| 5,678,410 A | 10/1997 | Fujita et al. | |
| 6,015,041 A | 1/2000 | Heung | |
| 6,159,538 A | 12/2000 | Rodriguez et al. | |
| 6,267,229 B1 | 7/2001 | Heung | |
| 6,329,076 B1 | 12/2001 | Kawabe et al. | |
| 6,342,198 B1 | 1/2002 | Zaluska et al. | |
| 6,358,488 B1 * | 3/2002 | Suda | 423/657 |
| 6,419,764 B1 | 7/2002 | Kamiya et al. | |
| 6,432,379 B1 | 8/2002 | Heung | |
| 6,444,361 B1 | 9/2002 | Komori et al. | |
| 6,471,936 B1 * | 10/2002 | Chen et al. | 423/658.2 |
| 6,534,033 B1 * | 3/2003 | Amendola et al. | 423/648.1 |
| 6,660,238 B2 * | 12/2003 | Rajoria | 423/220 |
| 6,811,764 B2 * | 11/2004 | Jorgensen et al. | 423/658.2 |
| 2003/0113252 A1 | 6/2003 | Chen et al. | |
| 2003/0129122 A1 | 7/2003 | Chen et al. | |

(Continued)

FOREIGN PATENT DOCUMENTS

EP    0 989 290 A2    3/2000

(Continued)

OTHER PUBLICATIONS

Sandia National Labs, "Hydride Materials Data Base" website, pp. 1-4; printed Mar. 12, 2004.

(Continued)

*Primary Examiner*—Wayne Langel

(57) ABSTRACT

In one aspect, the invention provides a hydrogen storage composition having a hydrogenated state and a dehydrogenated state. In the hydrogenated state, such composition comprises a hydride and a hydroxide. In a dehydrogenated state, the composition comprises an oxide. The present invention also provides methods of producing hydrogen, including for mobile fuel cell device applications.

107 Claims, 4 Drawing Sheets

U.S. PATENT DOCUMENTS

| | | | |
|---|---|---|---|
| 2003/0129126 | A1 | 7/2003 | Chen et al. |
| 2004/0033194 | A1* | 2/2004 | Amendola et al. ........ 423/658.2 |
| 2004/0258613 | A1* | 12/2004 | Heller et al. ................ 423/646 |
| 2005/0069489 | A1* | 3/2005 | Zhao et al. ............... 423/658.2 |

FOREIGN PATENT DOCUMENTS

| | | |
|---|---|---|
| EP | 1369947 | 12/2003 |
| EP | 1496014 | 1/2005 |
| GB | 1148048 | 4/1969 |
| WO | WO01/74710 | 10/2001 |

OTHER PUBLICATIONS

Hera "Storage of Hydrogen In Reversible Metal Hydrides" pp. 1-3; printed Mar. 17, 2004.

Pinkerton, et al., "Bottling The Hydrogen Genie", The Industrial Physicist, American Institute of Physics; pp. 20-23 (Feb./Mar. 2004).

Chen, Ping, Xiong, Zhitao, Luo, Jizhong, Lin, Jianyi, Tan, Kuang Lee. "Hydrogen Storage in Metal Nitride Systems". Edited by Ricardo B. Schwartz, Symposium V, Materials for Energy Storage, Generation and Transport, vol. 730, Apr. 2-4, 2002, pp. 376 and 385, V5.18.

Herbert Jacobs and Robert Juza, "Preparations and Properties of Magnesium Amide and Imide" Journal for Anorganic and General Chemistry, Band [vol.] 870 (1969) pp. 254-261. (English translation only; original German not available.).

Chen, Ping, Xiong, Zhitao, Luo, Jizhong, Lin, Jianyi, Tan, Kuang Lee. "Interaction of Hydrogen with Metal Nitrides and Imides" Nature Publishing Group [vol. 420] (Nov. 21, 2002) pp. 302-304 with Supplement pp. 1-6.

Robert Juza and Karl Opp, Metal Amides and Metal Nitrades, 25th Part 1), Journal for Anorganic and General Chemistry. 1951 Band vol. 266, pp. 325-330. (2 documents: English translation and origianl German.).

"Gmelins Handbuch der anorganischen Chemie, System-Nr. 2: Wasserstoff [Gmelin's Handbook of Inorganic Chemistry, System No. 2: Hydrogen]," 8th Completely Revised Edition, Berlin: Verlag Chemie GmbH, pp. 13, 14 (1927) (with English translation).

"Gmelins Handbuch der anorganischen Chemie, System-Nr. 21: Natrium 8 [Gmelin's Handbook of Inorganic Chemistry, System No. 21: Sodium 8]," 8th Completely Revised Edition, Supplementary vol. 2, Verlag Chemie GmbH, p. 804 (1965) (with English translation).

Official Letter issued by German Patent and Trademark Office in corresponding German patent application No. 11 2005 00 461.9, dated Aug. 8, 2007 (with English translation) (8 pages).

* cited by examiner

HYDROGEN STORAGE MATERIALS AND METHODS INCLUDING HYDRIDES AND HYDROXIDES

FIELD OF THE INVENTION

The present invention relates to hydrogen storage compositions, the method of making such hydrogen storage compositions and use thereof.

BACKGROUND OF THE INVENTION

Hydrogen is desirable as a source of energy because it reacts cleanly with air producing water as a by-product. In order to enhance the desirability of hydrogen as a fuel source, particularly for mobile applications, it is desirable to increase the available energy content per unit volume and per unit mass of storage. Presently, this is done by conventional means such as storage under high pressure, at thousands of pounds per square inch (e.g., 5,000 to 10,000 psi), cooling to a liquid state, or absorbing into a solid such as a metal hydride. Pressurization and liquification require relatively expensive processing and storage equipment.

Storing hydrogen in a solid material such as metal hydrides, provides volumetric hydrogen density which is relatively high and compact as a storage medium. Binding the hydrogen as a solid is desirable since it desorbs when heat is applied, thereby providing a controllable source of hydrogen.

Rechargeable hydrogen storage devices have been proposed to facilitate the use of hydrogen. Such devices may be relatively simple and generally are simply constructed as a shell and tube heat exchanger where the heat transfer medium delivers heat for desorption. Such heat transfer medium is supplied in channels separate from the chamber which houses the hydrogen storage material. Therefore, when hydrogen release is desired, fluids at different temperatures may be circulated through the channels, in heat transfer relationship with the storage material, to facilitate release of the hydrogen. For certain materials, recharging the storage medium can be achieved by pumping hydrogen into the chamber and through the storage material while the heat transfer medium removes heat, thus facilitating the charging or hydrogenating process. An exemplary hydrogen storage material and storage device arranged to provide suitable heat transfer surface and heat transfer medium for temperature management is exemplified in U.S. Pat. No. 6,015,041.

Presently, the selection of relatively light weight hydrogen storage material is essentially limited to magnesium and magnesium-based alloys which provide hydrogen storage capacity of several weight percent, essentially the best known conventional storage material with some reversible performance. However, such magnesium based materials have a limitation in that they take up hydrogen at very high temperature and high hydrogen pressure. In addition, hydrogenation of the storage material is typically impeded by surface oxidation of the magnesium. Other examples, such as $LaNi_5$ and $TiFe$, have relatively low gravimetric hydrogen storage density, since they are very heavy.

Therefore, in response to the desire for an improved hydrogen storage medium, the present invention provides an improved hydrogen storage composition, its use as a storage medium and a method for forming such materials.

SUMMARY OF THE INVENTION

In one aspect, the invention provides a method of producing hydrogen comprising conducting a reaction between a hydride composition and a hydroxide composition to form hydrogen and an oxide composition, wherein the hydroxide composition has one or more cationic species other than hydrogen.

In another aspect the present invention provides a method for releasing hydrogen from hydrogen storage materials comprising mixing a first hydrogen storage material with a second hydrogen storage material. The first hydrogen storage material comprises a hydride composition represented by $MI^x H_x$ and the second hydrogen storage material comprises a hydroxide composition represented by $MII^y(OH)_y$, where MI and MII each represent a cationic species or a mixture of cationic species other than hydrogen, and where x and y represent average valence states of respectively MI and MII. The method further comprises conducting a reaction between the first storage material with the second storage material for a time and at a temperature sufficient to produce a reaction product comprising an oxide material and hydrogen.

In still another aspect of the invention, a hydrogen storage composition has a hydrogenated state and a dehydrogenated state, where in the hydrogenated state, the composition comprises a hydride and a hydroxide having one or more cationic species other than hydrogen. In the dehydrogenated state, the composition comprises an oxide.

Another aspect of the present invention is a method of producing a source of hydrogen gas comprising liberating hydrogen from a solid hydrogenated starting material composition comprising a hydride and a hydroxide, by reacting the hydride and the hydroxide in a solid state reaction to produce a dehydrogenated reaction product and hydrogen gas.

Yet another aspect of the present invention provides a mixture of a hydride and a hydroxide having cationic species other than hydrogen, each one characterized by promoting release of hydrogen from the other one in the presence of at least one of: a catalyst and elevated temperature.

Another aspect of the invention relates to a power device comprising a fuel cell that uses hydrogen as fuel and a storage unit containing a hydrogen storage material having a hydrogenated state and a dehydrogenated state. The storage material releases hydrogen used as fuel in the fuel cell. The hydrogenated state of the storage material comprises a hydroxide having a cationic species other than hydrogen and a hydride. A filler passage is associated with the storage unit and supplying hydrogen to the dehydrogenated storage material in the storage unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
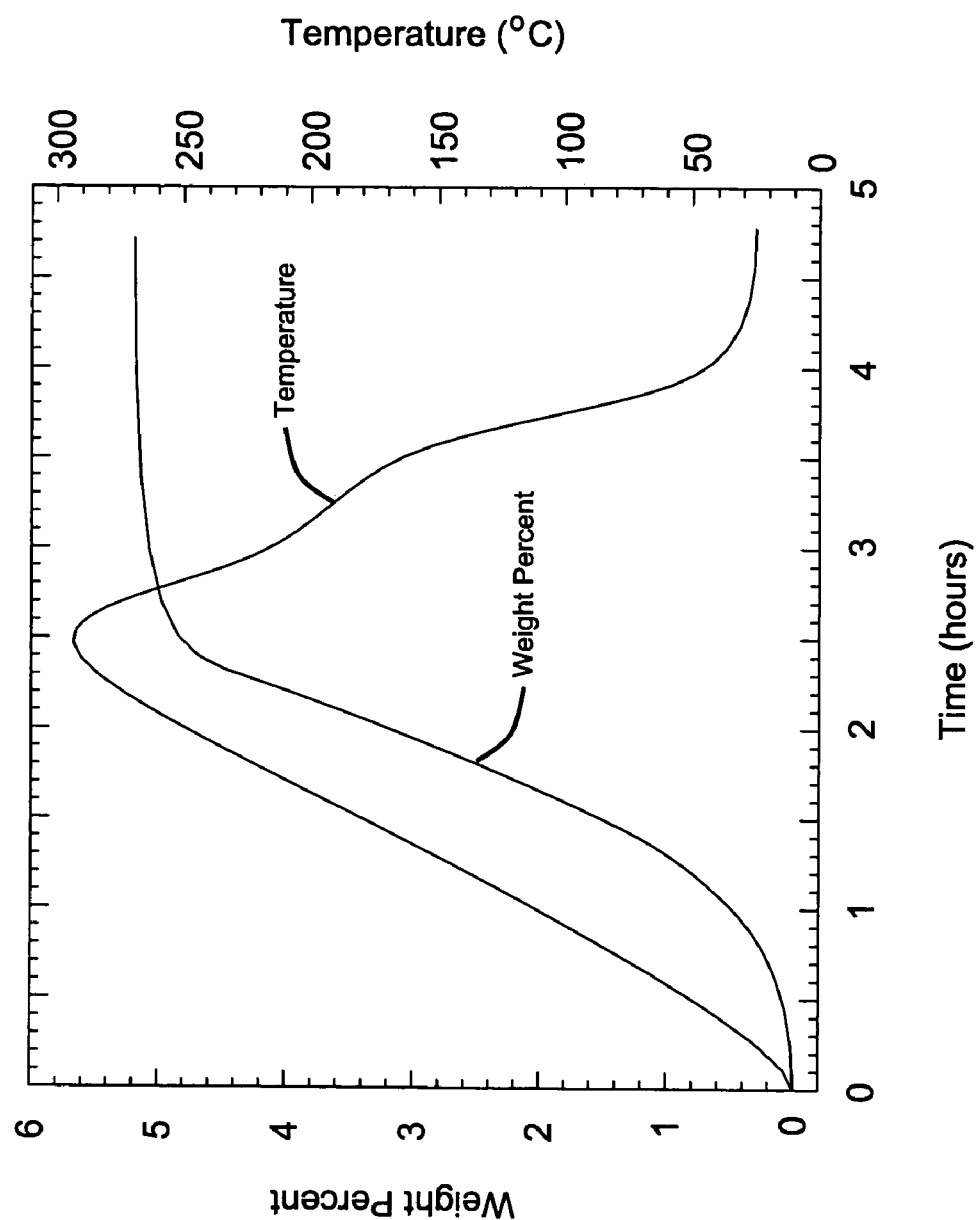
FIG. 1 shows hydrogen production by weight percent loss of hydrogen from a hydrogen storage material comprising lithium hydride and lithium hydroxide analyzed by a modified volumetric Sievert's apparatus analysis.

The following description of the preferred embodiment(s) is merely exemplary in nature and is in no way intended to limit the invention, its application, or uses.

In one aspect, the present invention provides methods of producing and releasing hydrogen from a hydrogen storage material system. In one preferred embodiment, a method is provided for releasing hydrogen from hydrogen storage materials by conducting a hydrogen production reaction by reacting a hydride composition and a hydroxide composition having one or more cations other than hydrogen. The hydrogen production reaction produces hydrogen and a reaction byproduct comprising an oxide composition. As used herein, the term "composition" refers broadly to a substance containing at least the preferred chemical compound, but which may also comprise additional substances or compounds, including impurities. The term "material" also broadly refers to matter containing the preferred compound or composition.

In another aspect, the present invention provides hydrogen storage materials. In one preferred embodiment of the present invention, a hydrogen storage composition has a hydrogenated state and a dehydrogenated state, therein providing two distinct physical states where hydrogen can be stored and subsequently released. In the hydrogenated state, the composition comprises a hydride and a hydroxide. In the dehydrogenated state, the composition comprises an oxide.

In one preferred embodiment of the present invention, the hydride is represented by the general formula $MI^xH_x$, where MI represents one or more cationic species other than hydrogen, and x represents the average valence state of MI, where the average valence state maintains the charge neutrality of the compound.

In another preferred embodiment of the present invention, the hydroxide is represented by the general formula $MII^y(OH)_y$, where MII represents one or more cationic species other than hydrogen, and y represents the average valence state of MII where the average valence state maintains the charge neutrality of the compound.

In yet another preferred embodiment of the present invention, the hydride composition is represented by $MI^xH_x$ and the hydroxide composition is represented by $MII^y(OH)_y$, where MI and MII respectively represent one or more cationic species other than hydrogen, and x and y represent average valence states of MI and MII, and where the average valence states maintain the charge neutrality of the compounds, respectively.

In accordance with the present invention, MI and MII each represent one or more of a cationic species or a mixture of cationic species other than hydrogen. It should be noted that MI and MII are independently selected from one another. Thus, the present invention contemplates MI and MII comprising the same cationic species, or in alternate preferred embodiments, MI and MII comprise distinct cationic species that are different from one another. Further, MI, MII, or both may be selected to be complex cations, which comprise two or more distinct cationic species. In the case where MI, MII, or both are complex cations, MI and MII may comprise one or more of the same cationic species, or may have entirely distinct cationic species from one another. Hydrides are often referred to as complex hydrides, which are further contemplated in the present invention. A complex hydride comprises two cationic species, however one of the cationic species forms an anionic group with hydrogen, which further interacts with a second cationic species. This concept can be expressed by the following formula with a hydride expressed as $MI^xH_x$, where MI comprises two distinct cationic species, M' and M", so that MI=M'+M". Thus, the hydride can be expressed as: $M'_d^a(M''^bH_c)_a^{-d}$ where $(M''^bH_c)$ is an anionic group, where d=(c−b) and a, b, c, and d are selected so as to maintain charge balance and electroneutrality of the compound. Cationic species that are preferred for all the preferred embodiments of the present invention include metal cations, as well as non-metal cations such as boron. Further, MII is also optionally selected to be an organic cationic group non-metal cation, such as $CH_3$.

Elements that form preferred cations and mixtures of cations for MI and MII in the type of compounds of the present invention are as follows. For both hydrides and hydroxides, certain preferred cationic species comprise: aluminum (Al), boron (B), barium (Ba), beryllium (Be), calcium (Ca), cesium (Cs), potassium (K), lithium (Li), magnesium (Mg), sodium (Na), rubidium (Rb), silicon (Si), strontium (Sr), titanium (Ti), vanadium (V), and mixtures thereof. Particularly preferred elements comprise: aluminum (Al), boron (B), beryllium (Be), calcium (Ca), potassium (K), lithium (Li), magnesium (Mg), sodium (Na), strontium (Sr), titanium (Ti), and mixtures thereof. The most preferred cationic species are Li and Na. Evaluation of the aforesaid known species produces, by analogy, the following added cationic species besides those recited above which are thought to be usable based on predictive thermodynamics, but not yet demonstrated, include arsenic (As), cadmium (Cd), cerium (Ce), europium (Eu), iron (Fe), gallium (Ga), gadolinium (Gd), germanium (Ge), hafnium (Hf), mercury (Hg), indium (In), lanthanum (La), manganese (Mn), neodymium (Nd), nickel (Ni), lead (Pb), praseodymium (Pr), antimony (Sb), scandium (Sc), selenium (Se), samarium (Am), tin (Sn), thorium (Th), thallium (Tl), tungsten (W), yttrium (Y), ytterbium (Yb), zinc (Zn), zirconium (Zr). For MII, another feasible cationic species comprises low molecular weight organic groups, such as methyl($CH_3$), ethyl($C_2H_5$), and propyl($C_3H_7$) groups.

In view of the above, the cationic species MI or MII generally comprise: aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), and zirconium (Zr). Additionally, MII may comprise an organic cationic species, such as methyl($CH_3$), ethyl($C_2H_5$), and propyl($C_3H_7$) groups.

In preferred embodiments of the present invention, a solid-state hydride composition (i.e., in particulate form) reacts with a hydroxide composition (i.e., in particulate form) via a solid-state reaction to produce and release gaseous hydrogen and a solid-state byproduct compound comprising an oxide. Where the hydride composition is selected as $MI^xH_x$ and the hydroxide composition is selected as $MII^y(OH)_y$, the hydrogen production reaction proceeds by the following reaction mechanism:

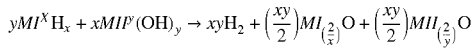
$$yMI^xH_x + xMII^y(OH)_y \rightarrow xyH_2 + \left(\frac{xy}{2}\right)MI_{\frac{2}{x}}O + \left(\frac{xy}{2}\right)MII_{\frac{2}{y}}O$$

where as previously discussed, x is the average valence state of MI and y is the average valence state of MII where the average valence states maintain the charge neutrality of the respective compounds. Thus, the hydrogenated state of the hydrogen storage composition corresponds to the hydrogenated hydride and hydrogenated hydroxide, and the dehydrogenated hydrogen storage composition corresponds to the one or more byproduct compounds comprising an oxide. It should be noted that where MI and MII are the same cationic species, which can be represented by M, the above reaction mechanism can be simplified to:

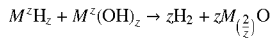
$$M^zH_z + M^z(OH)_z \rightarrow zH_2 + zM_{\frac{2}{z}}O$$

where z represents the average valence state of M, where the average valence state maintains the charge neutrality of the compound.

According to the present invention, it is preferred that at least one byproduct composition comprises an oxide having one or more cationic species of the hydroxide and hydride (i.e., MI, MII, or both). The independent selection of cationic species can vary the stoichiometry of the reaction and the types of byproduct compounds formed. It should be noted that the oxide byproduct compounds

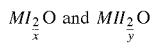
$$MI_{\frac{2}{x}}O \text{ and } MII_{\frac{2}{y}}O$$

(or

$$M_{\frac{2}{z}}O$$

in the case where MI and MII are the same cation M) may thermodynamically favor forming and/or decomposing into different byproduct compounds. Further, with certain reactants and stoichiometry of the reactants, such oxide byproduct compounds may also comprise higher-order complex hydrides, for example, as will be described in more detail below. These further byproducts are formed of the same general constituents as the primary byproducts, but they have different valence states, atomic ratios, or stoichiometry, depending on the cationic species involved, as recognized by one of skill in the art.

In certain preferred embodiments of the present invention the hydrogen storage composition comprises a hydride selected from the group consisting of: lithium hydride (LiH), sodium hydride (NaH), potassium hydride (KH), beryllium hydride ($BeH_2$), magnesium hydride ($MgH_2$), calcium hydride ($CaH_2$), strontium hydride ($SrH_2$), titanium hydride ($TiH_2$), aluminum hydride ($AlH_3$), boron hydride ($BH_3$), and mixtures thereof. Particularly preferred hydride compositions comprise LiH or NaH.

In alternate preferred embodiments of the present invention the hydrogen storage composition comprises a hydride which is a complex hydride selected from the group consisting of: lithium borohydride ($LiBH_4$), sodium borohydride ($NaBH_4$), magnesium borohydride ($Mg(BH_4)_2$), calcium borohydride ($Ca(BH_4)_2$), lithium alanate ($LiAlH_4$), sodium alanate ($NaAlH_4$), magnesium alanate ($Mg(AlH_4)_2$), calcium alanate ($Ca(AlH_4)_2$), and mixtures thereof. Particularly preferred complex hydrides comprise lithium borohydride ($LiBH_4$), sodium borohydride ($NaBH_4$), lithium alanate ($LiAlH_4$), and sodium alanate ($NaAlH_4$).

Further, other preferred embodiments of the present invention, comprise a hydroxide composition selected from the group consisting of: lithium hydroxide (LiOH), sodium hydroxide (NaOH), potassium hydroxide (KOH), beryllium hydroxide ($Be(OH)_2$), magnesium hydroxide ($Mg(OH)_2$), calcium hydroxide ($Ca(OH)_2$), strontium hydroxide ($Sr(OH)_2$), titanium hydroxide ($Ti(OH)_2$), aluminum hydroxide ($Al(OH)_3$), boron hydroxide ($B(OH)_3$) which is also known as boric acid and more conventionally is expressed as ($H_3BO_3$), and mixtures thereof. Particularly preferred hydroxide compounds comprise LiOH and NaOH.

Thus, according to one preferred embodiment of the present invention, a hydrogen production reaction is conducted by reacting a hydride comprising LiH with a hydroxide comprising LiOH. The reaction proceeds according to the reaction mechanism:

$$LiH + LiOH \rightarrow Li_2O + H_2.$$

This reaction produces a theoretical 6.25 weight % of hydrogen on a material basis.

In an alternate preferred embodiment of the present invention a hydrogen production reaction occurs by reacting a hydride comprising NaH with a hydroxide comprising LiOH. The reaction mechanism for this reaction can be expressed as $$NaH + LiOH \rightarrow \tfrac{1}{2}Li_2O + \tfrac{1}{2}Na_2O + H_2.$$

This reaction generates a theoretical 4.1 weight % hydrogen on a material basis. It should be noted that the byproduct compounds are generally expressed as $Li_2O$ and $Na_2O$, however, mixed or partially mixed metal oxides may form based on the conditions at which the reaction takes place, and may be thermodynamically favored. Thus, for example, the byproduct composition may comprise an oxide composition comprising a mixed cation oxide

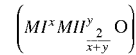
$$\left(MI^xMII^y_{\frac{2}{x+y}}O\right)$$

formed as a byproduct, where x and y are the average valence states of MI and MII, respectively, and where the average valence state maintains the charge neutrality of the compound. In such a case, the above reaction may form LiNaO as a byproduct compound. The mixed cation oxide byproduct compound may comprise the entire oxide product, or may be mixed with the single cation oxides to result in multiple distinct oxide byproduct compounds, depending on the thermodynamics of the reaction.

In certain preferred embodiments of the present invention, the reaction mechanism for producing hydrogen from the hydride and hydroxide is reversible. By "reversible" it is meant that a species of a starting material hydroxide or hydride is regenerated at temperature and pressure conditions which are economically and industrially useful and practicable. Particularly preferred "reversible" reactions include those where exposing one or more byproduct compounds to hydrogen regenerates a species of a starting material hydroxide or hydride. In the same manner, a "non-reversible reaction" generally applies to both reactions that are irreversible via the reaction mechanism pathway, and also to those reactions where regenerating a species of a starting material hydride or hydroxide by exposure to hydrogen is carried out at impractical processing conditions, such as, extreme temperature, extreme pressure, or cumbersome product removal, which prevents its widespread and practical use. Endothermic hydrogen formation reactions according to the present invention are generally reversible at desirable temperature and pressure conditions.

One aspect of the present invention is a reduction in the overall energy requirements for a system of storing and subsequently releasing hydrogen. Minimizing the overall enthalpy changes associated with the hydrogen storage material system results in an improvement of the overall efficiency of the fuel cell system. As the overall enthalpy change increases, so do the requirements for managing heat transfer systems (heating and cooling operations). In particular, it is highly advantageous to minimize heating and cooling systems in mobile units containing fuel cells (e.g., vehicles or electronic devices), because additional systems draw parasitic energy and increase the overall weight of the mobile unit, thereby decreasing its gravimetric efficiency.

Other advantages of minimizing overall enthalpy change in the hydrogen storage system are often realized during start-up and other transient conditions (e.g., low load conditions), because there is less diversion of energy from other important system operations. Thus, one aspect of the present invention is a minimization of the overall energy necessary to both produce and regenerate a hydrogen storage material. In preferred embodiments of the present invention, the energy required for hydrogen production and recharge is relatively low, and vastly improved when compared to energy requirements of prior art hydrogen storage systems.

As previously discussed, one preferred embodiment of the present invention comprises a hydrogen storage composition where the hydride is lithium hydride LiH and the hydroxide is lithium hydroxide LiOH, which react with one another to form $Li_2O$ and $H_2$. The enthalpy of reaction ($\Delta H_r$) for the hydrogen production reaction was calculated based on the standard heat of formation ($\Delta H_f$) for each of the compounds, and resulted in theoretical $\Delta H_r$ of $-23.3$ kJ/mol-$H_2$. This $\Delta H_r$ indicates an exothermic reaction, with a relatively low enthalpy (and thus a low level of heat production). Minimizing the amount of heat released into the fuel cell system is preferred, because larger enthalpies result in larger quantities of emitted heat, which must be controlled by cooling systems to prevent damage to the surrounding environment, especially in a fuel cell system where certain components (e.g., control circuitry or the membrane exchange assembly (MEA)) potentially degrade upon exposure to higher temperatures. As the enthalpy of the reaction increases, the size and complexity of the heat transfer system becomes much larger. Further, larger heats of reaction have the potential to be less controllable and often cannot be stopped prior to complete reaction. The present embodiment thus provides a relatively low exothermic heat of reaction for the hydrogen production reaction. An exothermic hydrogen production reaction has an advantage of not requiring a sustained input of external energy from the fuel cell system for hydrogen generation (aside from any activation energy necessary to initiate the reaction, as will be discussed in more detail below). It is preferred that the heat released by the hydrogen generation reaction is dissipated by a heat transfer system, as it is preferred to maintain the storage materials at a constant temperature during the reaction. However, the present embodiment does not require an extensive cooling system and further provides good control over the reaction as it proceeds.

Other preferred embodiments according to the present invention have an exothermic hydrogen production reaction and include reactions between a hydride composition $MI^rH_x$ and a hydroxide composition $MII^{r'}(OH)_y$, where MI and MII are selected to be the same cationic species selected from the group consisting of Al, B, Be, Ca, Mg, Sr, and Ti. These reactions have a higher enthalpy of reaction $\Delta H_r$ than the previous embodiment, and include for example, the following reactions. Where the hydride is selected to be $MgH_2$ and the hydroxide is selected to be $Mg(OH)_2$, the reaction can be expressed as:

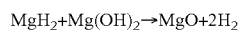
$$MgH_2 + Mg(OH)_2 \rightarrow MgO + 2H_2$$

which has a $\Delta H_r$ of $-101.3$ kJ/mol-$H_2$ and a theoretical hydrogen production of 4.7 wt. %. Where the hydride is selected to be $AlH_3$ and the hydroxide is selected to be $Al(OH)_3$, the reaction can be expressed as:

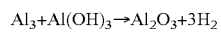
$$Al_3 + Al(OH)_3 \rightarrow Al_2O_3 + 3H_2$$

which has a $\Delta H_r$ of $-129.3$ kJ/mol-$H_2$ and a theoretical hydrogen production of 5.5 wt. %. In the case where the hydride is selected to be $CaH_2$ and the hydroxide is selected to be $Ca(OH)_2$, the reaction can be expressed as:

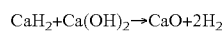
$$CaH_2 + Ca(OH)_2 \rightarrow CaO + 2H_2$$

which has a $\Delta H_r$ of $-53.7$ kJ/mol-$H_2$ and a theoretical hydrogen production of 3.4 wt. %. Where the hydride is selected to be $SrH_2$ and the hydroxide is selected to be $Sr(OH)_2$, the reaction can be expressed as:

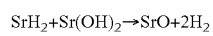
$$SrH_2 + Sr(OH)_2 \rightarrow SrO + 2H_2$$

which has a $\Delta H_r$ of $-17.7$ kJ/mol-$H_2$ and a theoretical hydrogen production of 1.9 wt. %. Where the hydride is selected to be $BH_3$ and the hydroxide is selected to be $B(OH)_3$, the reaction can be expressed as:

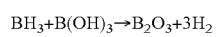
$$BH_3 + B(OH)_3 \rightarrow B_2O_3 + 3H_2$$

which has a $\Delta H_r$ of $-94.9$ kJ/mol-$H_2$ and a theoretical hydrogen production of 7.9 wt. %. Where the hydride is selected to be $BeH_2$ and the hydroxide is selected to be $Be(OH)_2$, the reaction can be expressed as:

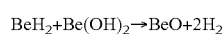
$$BeH_2 + Be(OH)_2 \rightarrow BeO + 2H_2$$

which has a $\Delta H_r$ of $-147.4$ kJ/mol-$H_2$ and a theoretical hydrogen production of 7.4 wt. %.

An additional exothermic hydrogen production reaction according to the present invention comprises reacting lithium hydride (LiH) with boron hydroxide ($B(OH)_3$) (which is more typically known as boric acid and expressed as $H_3BO_3$), which under certain pressure, temperature, and other reaction conditions proceeds by the following reaction mechanism:

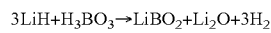
$$3LiH + H_3BO_3 \rightarrow LiBO_2 + Li_2O + 3H_2$$

which has a $\Delta H_r$ of $-84.2$ kJ/mol-$H_2$ and a theoretical hydrogen production of 6.9 wt. %. Under different pressure, temperature, and other reaction conditions, the same reactants can proceed according to the following reaction mechanism, where the oxide product differs from the two oxide products above (i.e., $LiBO_2$ and $Li_2O$), and forms a single complex higher order oxide product ($Li_3BO_3$):

$$3LiH+H_3BO_3 \rightarrow Li_3BO_3+3H_2$$

which likewise has a $\Delta H_r$ of $-84.2$ kJ/mol-$H_2$ and a theoretical hydrogen production of 6.9 wt. %.

Further preferred alternate embodiments of the present invention, are where the hydride composition is $MI^rH_x$ and the hydroxide is $MII^p(OH)_y$, where the hydride is a complex hydride $M'_d{}^a(M''^bH_c)^{-d}$ where M' is selected to be lithium and M'' is selected to be boron, and the reaction is exothermic, include the following reactions. The first hydrogen production reaction occurs between:

$$LiBH_4+4LiOH \rightarrow LiBO_2+2Li_2O+4H_2$$

where a theoretical 6.8 weight % of hydrogen is produced and the reaction has a $\Delta H_r$ of $-22$ kJ/mol-$H_2$. A second hydrogen production reaction with a complex hydride where M' is sodium and M'' is boron, includes the reaction:

$$NaBH_4+2Mg(OH)_2 \rightarrow NaBO_2+2MgO+4H_2$$

which produces a theoretical 5.2 weight % of hydrogen and a $\Delta H_r$ of $-34$ kJ/mol-$H_2$.

Another preferred embodiment of the present invention previously discussed is that where the hydride is sodium hydride (NaH) and the hydroxide is lithium hydroxide (LiOH). A calculated heat of reaction ($\Delta H_r$) is $+9.7$ kJ/mol-$H_2$, which indicates an endothermic heat of reaction, which is relatively small. Thus, producing hydrogen with this hydrogen storage material system would require only slight heating throughout the hydrogen production reaction. However, because the overall quantity of heat generated is relatively low, this embodiment is preferred for certain applications. The endothermic nature of the hydrogen production reaction allows for an exothermic recharging reaction.

In certain applications, this hydrogen storage material composition may be preferred because the regeneration reaction is generally reversible at relatively low temperature and pressure conditions. For example, a predicted equilibrium pressure for the byproduct material comprising oxide is approximately 1 bar at 50° C., thus upon exposure to pressurized hydrogen above the equilibrium pressure, the material will absorb and react with hydrogen to regenerate a species of the hydride and hydroxide: NaH and LiOH (and preferably both). It should be noted that in circumstances where the byproduct composition comprises a mixed cation oxide (LiNaO), the species of regenerated hydride and hydroxides may also comprise a species of hydride and hydroxide different from the starting material compositions, for example NaOH, LiH, or mixed cation hydrides and hydroxides, such as $LiNa(OH)_2$, for example. As recognized by one of skill in the art, when the materials are recharged to form different starting materials comprising a species of hydroxide and hydride, the hydrogen production reaction thermodynamics may change, such that the heat of reaction may likewise changes. The feasibility of recharging the hydrogen storage material with hydrogen at relatively low temperatures and pressures makes the present embodiment, and those with similar properties, desirable for mobile units, where the hydrogen storage material can be regenerated at the point-of-use (e.g., on-board), without need for further processing and reacting at an offsite facility.

Other preferred embodiments according to the present invention, where the hydrogen generation reaction is endothermic, include one where MI and MII are each selected to be sodium, such that the hydrogen production reaction proceeds according to the reaction mechanism:

$$NaH+NaOH \rightarrow Na_2O+H_2,$$

that has a theoretical hydrogen production amount of 3.1 weight %. The theoretical enthalpy of reaction $\Delta H_r$ is $+67.4$ kJ/mol-$H_2$. The present embodiment is likewise useful for on-board regeneration for a mobile unit, and has a predicted equilibrium pressure of 1 bar at 475° C. Another preferred embodiment is where MI and MII are selected to be potassium, and proceeds according to the reaction mechanism:

$$KH+KOH \rightarrow K_2O+H_2$$

with a theoretical hydrogen generation of 2.1 weight %. The theoretical enthalpy of reaction $\Delta H_r$ for the potassium hydroxide and potassium hydride hydrogen production reaction is $+119.7$ kJ/mol-$H_2$.

Further preferred alternate embodiments of the present invention, where the hydrogen production reaction is exothermic are where the hydride composition is $MI^rH_x$ and the hydroxide is $MII^p(OH)_y$, where the hydride is selected to be a complex hydride (i.e., $M'_d{}^a(M''^bH_c)^{-d}$, for example, $NaBH_4$, where M' is Na and M'' is B) and the reaction is endothermic, include the following exemplary reaction:

$$NaBH_4+4NaOH \rightarrow NaBO_2+2Na_2O+4H_2$$

which produces a theoretical 4.0 weight % and a $+21$ kJ/mol-$H_2$.

Alternate preferred embodiments of the present invention include varying the stoichiometry of the starting material reactant hydride and hydroxide to produce higher-order complex oxide products. Thus, for example, a complex hydride, such as for example, lithium borohydride ($LiBH_4$) reacts with a hydroxide, for example boron hydroxide $B(OH)_3$ (i.e., boric acid $H_3BO_3$) to form a higher-order complex oxide compound according to the following reaction mechanism:

$$3LiBH_4+4H_3BO_3 \rightarrow Li_3B_7O_{12}+12H_2$$

which produces the complex higher-order oxide compound $Li_3B_7O_{12}$ and a theoretical 7.6 wt. % of hydrogen.

Yet another preferred embodiment comprises a hydroxide where MII is a relatively low molecular weight organic group, such as, methyl, ethyl, and propyl groups. One example of such a hydrogen production reaction, where the hydride composition is selected to be lithium hydride (LiH) and the hydroxide composition is selected to be methanol ($CH_3OH$) the reaction proceeds according to the following alcoholysis mechanism:

$$LiH+CH_3OH \rightarrow LiOCH_3+H_2.$$

As appreciated by one of skill in the art, any number of variations of hydride and hydroxide combinations are contemplated by the present invention, and may include any number of combinations of MI and MII selections. Further, the hydroxide compositions or the hydride compositions may comprise mixtures of hydroxide or hydride compounds. For example, the hydroxide compositions may comprise a plurality of distinct hydroxide compounds (e.g. LiOH, NaOH) mixed with one another for reacting with a hydride composition. Thus, the embodiments disclosed above are merely exemplary of a wide range of species which are useful with the hydrogen storage material composition of the overall present invention.

Another preferred embodiment of the present invention provides a hydroxide composition which comprises a hydrated hydroxide which reacts with a hydride. Many hydroxide compounds readily form hydrated compounds, due to their hydroscopic nature. It is preferred that the hydrated hydroxide compound comprises at least a portion of the hydroxide compound (i.e., that the starting material hydroxide is a mixture of non-hydrated hydroxide and hydrated hydroxide), or in an alternate embodiment that hydrated hydroxide comprises all of the hydroxide composition starting material. A hydrated hydroxide increases the density of hydrogen stored within the hydrogen storage material increases hydrogen content, but likewise increases the weight of the material and potentially increases the heat evolved. The heat evolved from the hydrated hydroxide compounds may be beneficial to offset certain endothermic reaction systems, thereby reducing the overall enthalpy and heat of reaction.

Although not wishing to be bound by any particular theory, it is theorized that the water of hydration attached to the hydroxide reacts with a portion of the hydride in a first exothermic initiation reaction, which produces heat and hydroxide. The remaining portion of hydride (now dehydrated) is available to react in a hydrogen production reaction with the hydroxide. Thus, the starting material compositions comprise a hydride $MI^xH_x$ and a hydrated hydroxide $MII^y(OH)_y \cdot wH_2O$; where y represents the average valence state of MII to maintain charge neutrality of the hydroxide compound and w represents a stoichiometric amount of water. A first portion of the hydride reacts with the hydration water to provide heat to the surrounding starting material and to form a hydroxide product. The remaining portion of the hydride reacts with the hydroxide which comprises the newly formed product from the initiation reaction, as well as the initial hydroxide provided in the starting material. Thus, the heat of reaction is more exothermic in the embodiment where the hydroxide is hydrated, versus the embodiment where the hydroxide is dehydrated.

The reaction proceeds according to the following:

$$(y+2w)MI^xH_x + xMII^y(OH)_y \cdot wH_2O \rightarrow$$
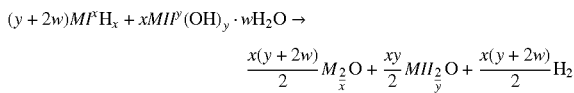

where as previously discussed, x is the average valence state of MI and y is the average valence state of MII, where the average valence state maintains the charge neutrality of the compound, and where w is a stoichiometric amount of water present in the hydrated hydroxide compound.

Preferred hydride compositions for the present embodiment are the same as those described above in previous embodiments. Particularly preferred hydride compounds comprise LiH, LiBH$_4$, NaBH$_4$, MgH$_2$, NaH, and mixtures thereof. Preferred hydrated hydroxide compounds comprise primarily the same cationic species as those discussed in the non-hydrated hydroxide embodiments above, including aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), zirconium (Zr), and mixtures thereof.

Preferred hydrated hydroxide compounds according to the present invention include, by way of example, Ba(OH)$_2$.3H$_2$O, Ba(OH)$_2$.H$_2$O, KOH.H$_2$O, NaOH.H$_2$O. Particularly preferred hydrated hydroxide compounds comprise: LiOH.H$_2$O and NaOH.H$_2$O. The hydrated hydroxide may also form a complex cationic hydrated hydroxide compound comprising complex cationic species, such that MII comprises two cationic species. Examples of such complex cationic hydrated hydroxide compounds include, LiAl$_2$(OH)$_7$.2H$_2$O and Mg$_6$Al$_2$(OH)$_{18}$.4H$_2$O. It should be noted that the quantity of water in the hydrated compound may comprise more than one molecule of water (i.e., that w, the stoichiometric ratio of water, may vary), depending on the hydroxide compound and its propensity for hydration. The present invention further contemplates mixtures of hydrated hydroxide compounds (as well, as alternate embodiments having mixtures of hydrated and non-hydrated hydroxide compounds, which were previously described above).

Certain preferred reactions according to the present embodiment, include those where a hydrated hydroxide compound reacts with a hydride compound. The following non-limiting examples are where the hydride composition is $MI^xH_x$ and the hydrated hydroxide is represented by $MII_y(OH)_y \cdot zH_2O$, and where MII is selected to be lithium:

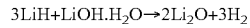

which produces a theoretical 9.0 weight % and a $\Delta H_r$ of −45.2 kJ/mol-H$_2$. Another reaction according to the present embodiment is where:

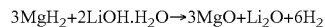

which produces a theoretical 7.4 weight % and a $\Delta H_r$ of −99 kJ/mol-H$_2$. Yet another reaction with a hydrated hydroxide is as follows:

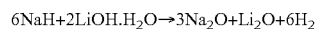

which produces a theoretical 5.3 weight % and a $\Delta H_r$ of +11 kJ/mol-H$_2$. Yet another reaction is:

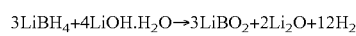

which produces a theoretical 10.2 weight % and an exothermic $\Delta H_r$ of −43.5 kJ/mol-H$_2$.

Similar examples of reactions where the hydrated hydroxide comprises MII selected to be sodium proceed as follows:

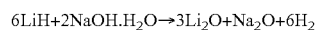

which produces a theoretical 7.3 weight % and an exothermic $\Delta H_r$ of −34.2 kJ/mol-H$_2$. A similar reaction which is endothermic is as follows:

which produces a theoretical 4.6 weight % and a $\Delta H_r$ of +22.0 kJ/mol-H$_2$. Another preferred exothermic reaction is as follows:

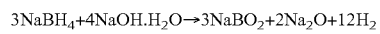

which produces a theoretical 6.9 weight % and an exothermic $\Delta H_r$ of −21.4 kJ/mol-H$_2$.

Alternate preferred embodiments of the present invention contemplate a mixture of starting material hydroxide comprising hydrated hydroxide and non-hydrated hydroxide starting materials which react with hydrides to produce hydrogen and a "complex oxide", meaning the oxide has higher order atomic ratio of oxygen to cationic species as compared to the simple oxides of the previous embodiments, as recognized by one of skill in the art. Such a reaction system includes both the general reaction of the hydride plus hydroxide (a first hydrogen generation reaction)

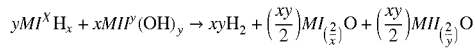

and the hydride plus hydrated hydroxide (a second hydrogen generation reaction)

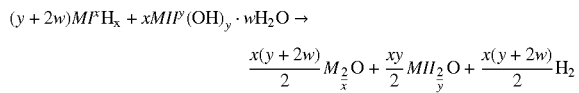

where the starting reactant material compositions, comprising hydrides, hydroxides, and hydrated hydroxides, can be combined in any number of proportions to conduct both the first and second hydrogen generations concurrently. With such a combination of reactions, the amount of heat release can be designed by accounting for the quantities of reactants added and the corresponding heat of reaction for both the first and second hydrogen production reactions. Generally, the second hydrogen generation reaction where hydrated hydroxide reacts with a hydride is generally more exothermic than the first hydrogen generation reaction where a non-hydrated hydroxide reaction with a hydride.

Thus, reaction systems, such as those described above, comprise a combination of reactions for both hydrated hydroxide and non-hydrated hydroxides that are useful in designing a reaction to have a targeted overall heat of reaction. As previously discussed, one aspect of the present invention is the minimization of the overall enthalpy of the reaction system, which can be further controlled by adding a selected mass of hydrated hydroxide to the starting material mixture. Further, the hydrated hydroxides contain a greater amount of hydrogen per formula unit, and mixtures of hydrated hydroxides with non-hydrated hydroxides can be designed for larger hydrogen production due to a larger quantity of hydrogen present in the starting materials.

Examples of such combined reaction systems, where both the hydrides of the first and second hydrogen production reactions are selected to be the same, and a hydroxide composition comprises both hydrated and non-hydrated hydroxides both having the same cationic species such as where the cationic species of the hydride is lithium (LiH) and the hydroxides also have lithium (LiOH) according to the present invention, can be expressed in the simplified reaction mechanism:

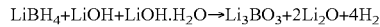

which generates an oxide ($Li_2O$) and a complex oxide ($Li_3BO_3$) and a theoretical 9.0% by weight of hydrogen. Yet another example, where the reactants are the same, but provided at a different stoichiometry, produces different products in the following reaction:

which generates a complex oxide ($Li_4B_2O_5$), a simple hydride (LiH) and a theoretical 9.2% by weight hydrogen.

The present invention provides a mixture of a hydride and a hydroxide having cationic species other than hydrogen, each one characterized by promoting the release of hydrogen from the other one, in the presence of: a catalyst, elevated temperature, or both.

The present invention also provides a method of producing a source of hydrogen gas comprising liberating hydrogen from a hydrogenated starting material comprising a hydride and a hydroxide, where the hydroxide has one or more cationic species other than hydrogen and by reacting the hydride with the hydroxide to produce a dehydrogenated product and hydrogen gas. In certain preferred embodiments, the hydrogenated starting material composition can be regenerated by exposing the dehydrogenated product (which preferably comprises an oxide composition) to hydrogen gas. As the liberating proceeds, it is preferred that the hydrogen gas is removed, both to collect the hydrogen gas as fuel for the fuel cell, and in some reaction systems to drive the reaction forward. The liberation of hydrogen gas can be conducted in the presence of an appropriate catalyst contacting the starting material composition to facilitate hydrogen release.

In preferred embodiments of the present invention, a hydrogen production reaction is conducted by a solid-state reaction, where the starting materials are in particulate form. The desirable particle size of the starting materials is related to its hydrogen release performance. Particles which are too coarse extend the time for the hydrogen release reaction at a given temperature. As will be discussed in more detail below, a smaller particle size may contribute to overcoming activation energy barriers by increasing the surface area interface between the hydrogenated starting material reactants. Further, it is preferred that the starting material reactants are essentially homogeneously mixed together, to enhance the reactivity of the mixture of hydrogenated starting material reactants. By "essentially homogeneously mixed" it is meant that the different starting material reactants are distributed with one another sufficiently that the reaction rate is not significantly inhibited by isolation of reactant particles from one another. It is preferred that starting material particles have a size on the order of 100 micrometers (μm), which can be achieved by ball milling for 1 to 10 hours, for example, to form a suitable starting material. Preferably the particle size of the reactants is on the order of less than about 10 micrometers, and most preferably less than 1 micrometer.

EXAMPLE 1

This example demonstrates the hydrogen storage material system where MI and MII are selected to be lithium in the hydrogen storage material system. An equal molar ratio of lithium hydride (LiH) and lithium hydroxide (LiOH) were weighed at 0.248 g of LiH and 0.756 g of LiOH and were mixed to form the hydrogenated mixture the hydrogen storage media system, that releases hydrogen according to the following reaction to produce hydrogen:

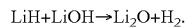

The mixing was accomplished using standard ball milling techniques at room temperature under ambient conditions for 60 minutes. Some hydrogen generation was noted during the milling process. The mixture was then heated at a rate of 2° C. per minute up to a maximum temperature of 300° C. while under ambient conditions and analyzed by a modified Sievert's apparatus, where the volumetric gas absorption is measured and converted to a weight percentage.

This analysis is shown in FIG. 1, where a total of 5.3 weight % was generated (with the difference between the theoretical 6.25 weight % being attributed to the hydrogen generated and either lost during the milling process or due to impurities in the starting materials). From the graph, it is apparent that hydrogen generation begins at about 80° C. and accelerates at approximately 170° C.

EXAMPLE 2

The hydrogen storage material system is the same as that in Example 1. Equal molar ratios of lithium hydroxide (LiOH) and lithium hydride (LiH) with measured amounts of 0.249 g LiH and 0.749 g of LiOH were mixed together and mechanically milled using the same ball milling techniques as described in Example 1, except that the mixture was milled for a shorter duration of 12 minutes.

EXAMPLE 3

A hydrogen storage material system where the hydride is lithium hydride (LiH) and the hydroxide is lithium hydroxide (LiOH), similar to Example 2 above, is reacted in the presence of a catalyst, titanium chloride, $TiCl_3$. A mixture of an equal molar ratio of lithium hydride (LiH) and lithium hydroxide (LiOH) weighed as 0.201 g LiH and 0.611 g of LiOH were mixed with one another. The catalyst was further added during milling at 10 mol % weighed at 0.385 $TiCl_3$, and the entire mixture was then milled for 12 minutes.

The resulting samples from Examples 2 and 3 were subjected to a modified Sievert's analysis, where heat was applied in increasing steps. The first heating step reached a temperature of 100° C. (point A), the second step ramps up to 200° C. (point B) and then the final step reached 250° C. (point C). As can be observed from the data, the hydrogen generation began at approximately 80° C. for the Sample from Example 2 without a catalyst. As the temperature was held constant through the first step at 100° C., the rate of hydrogen generation in the Example 2 Sample slowed reaching only approximately 0.7 wt. %. Increasing the temperature to the next step of 200° C. increased the amount of hydrogen generated, but as the sample remained at 200° C. the rate of hydrogen generation slowed. As the sample temperature was again elevated, to the 250° C. interval, a similar behavior was observed, where hydrogen production slowed at constant temperature. After increasing to 250° C., 5.7 wt. % of hydrogen was generated. This amount is closer to the theoretical hydrogen amount of 6.25 wt. % and the amount in Example 1, and is attributed to less hydrogen generated or lost during the milling process.

Figure 2:
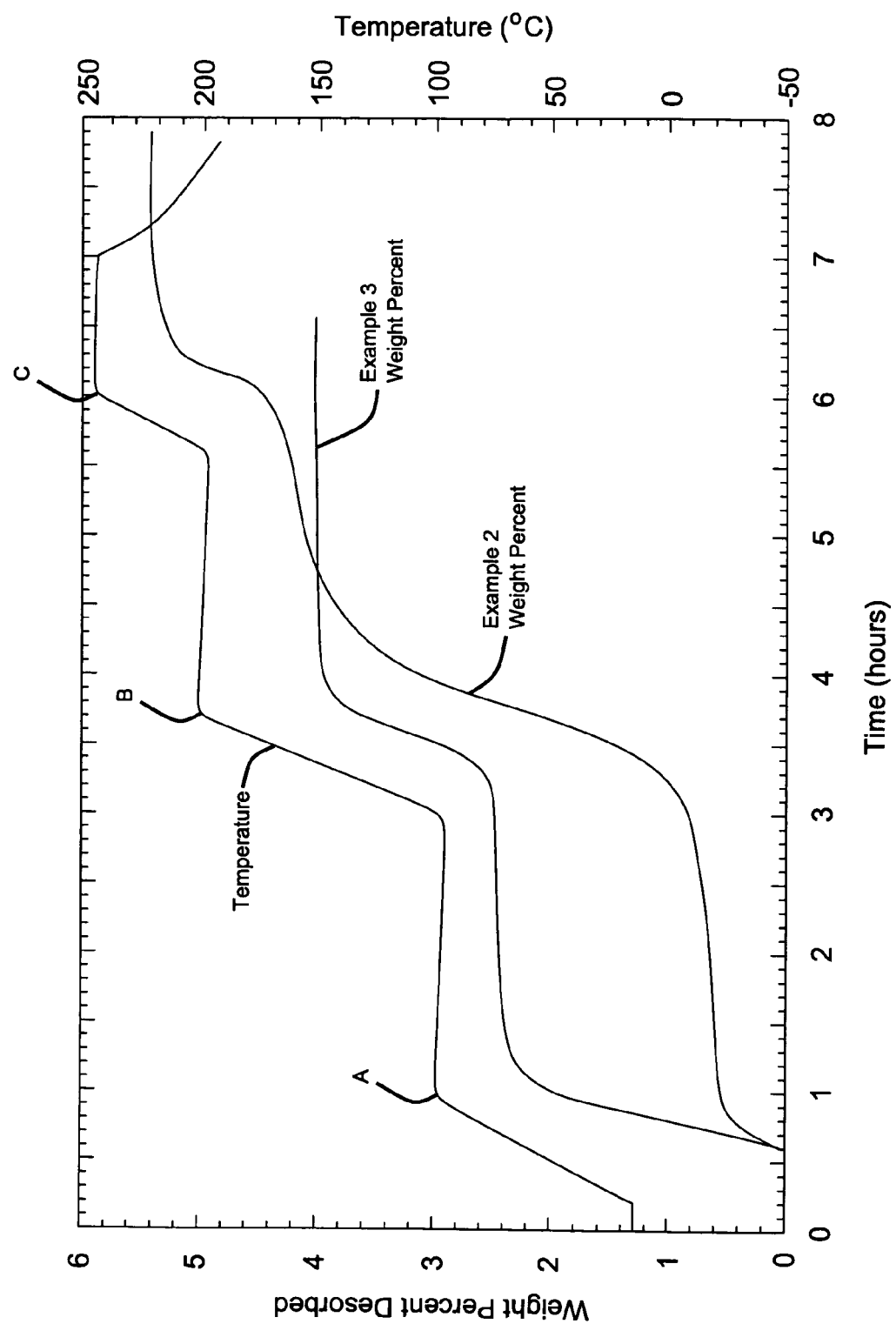
FIG. 2 is a graph showing hydrogen production for a hydrogen storage material comparing a first sample comprising lithium hydride and lithium hydroxide and a second sample comprising lithium hydride, lithium hydroxide, and a catalyst, where temperature is incrementally increased in a modified Sievert's apparatus.

The data shown in FIG. 2 suggests that there is an activation energy barrier for this exothermic reaction that occurs at about 80° C., where the hydrogen release initiates. As can be observed from the data, the presence of a catalyst during the hydrogen generation reaction significantly accelerates hydrogen evolution. For example, at 100° C., only approximately 0.7 wt. % hydrogen was produced for the mixture made in Example 2 without a catalyst, as where approximately 2.7 wt. % hydrogen was generated at 100° C. for the mixture of Example 3 with 10 mol. % catalyst. The overall lower quantity of hydrogen produced in the Example 3 sample is likely attributed to premature production of hydrogen during the milling process.

The behavior of the hydrogen storage material system in both FIGS. 1 and 2 shows that the hydrogen production reaction is kinetically limited. The sample from Example 3 where the catalyst was added demonstrates that the catalyst facilitates greater hydrogen release at relatively low temperatures. Due to the fact that the hydrogen production reaction in the lithium hydride and lithium hydroxide system is exothermic, the thermodynamic equilibrium state corresponds to a nearly complete reaction at room temperature. It is also possible that product (such as, solid phase byproduct oxide composition or hydrogen gas) accumulating where the reaction is occurring in the hydrogen storage material mixture may inhibit full release of hydrogen from the storage material. The reaction can be driven towards complete release of hydrogen by addressing both the activation energy barrier and the inhibition by product build-up through various means recognized by one of skill in the art.

For example, as previously discussed, mixing the solid reactant particles in an essentially homogenous mixture on a fine scale facilitates greater hydrogen release from the hydrogen storage compositions. Also, suitable catalysts (such as the $TiCl_3$ in Example 3) may be selected to facilitate the reaction and drive it to completion by overcoming any initiation/activation energy barriers. Exemplary catalysts suitable for use with the present invention include for example, compounds comprising elements selected from the group consisting of Ti, V, Cr, C, Fe, Mn, Ni, Si, Al, Nb, Pd, and mixtures thereof. Such catalyst compounds may be selected in elemental form, or may comprise hydride, halide, oxide, or nitride compounds, for example. A non-limiting list of such catalyst compounds includes: $TiCl_3$, $TiO_2$, TiN, $V_2O_5$, $SiO_2$, $Nb_2O_5$, and $Al_2O_3$, for example.

Further, products may be removed as the reaction proceeds. For example, hydrogen gas will easily be removed, and methods of solid-solid separation recognized by one of skill in the art may be employed to address the accumulation of solid phase oxide compositions in the hydrogen storage materials. Additionally, as will be discussed in greater detail below, one preferred embodiment of the present invention initiates the hydrogen production reaction by providing heat via a second exothermic reaction to overcome the activation energy barrier of the hydrogen production reaction. This exothermic initiation reaction transfers heat to the solid-state reactants in an amount sufficient to initiate the subsequent hydrogen generation reaction with one another.

EXAMPLE 4

Figure 3:
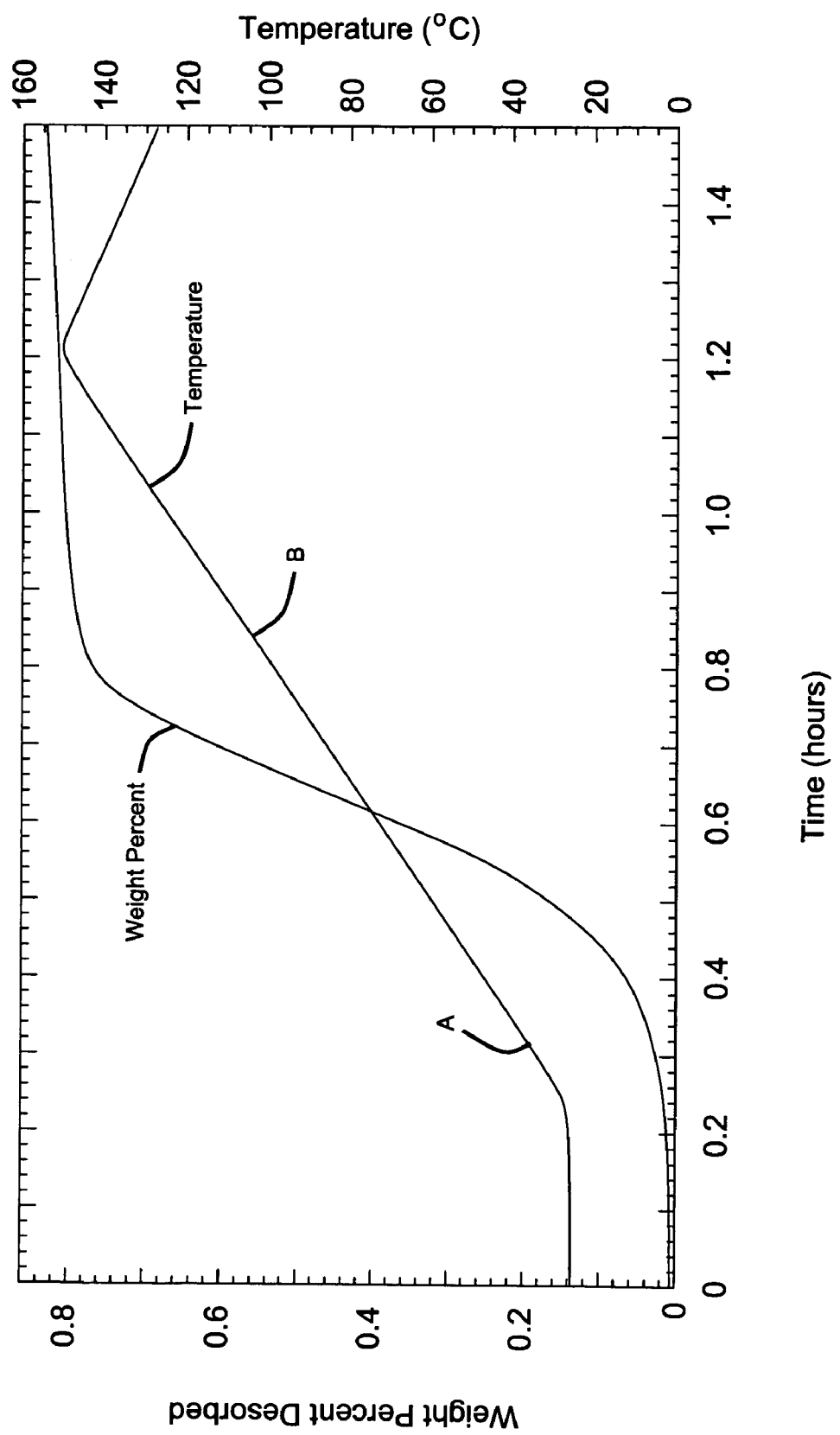
FIG. 3 is a graph showing hydrogen production over time for a hydrogen storage material comprising sodium hydride and lithium hydroxide from a modified Sievert's apparatus analysis.

In Example 4, a mixed cation hydrogen storage material system is provided where MI is selected to be sodium and MII is selected to the lithium. An equal molar ratio of sodium hydride (NaH) and lithium hydroxide (LiOH) weighed as 0.655 g NaH and 0.652 g of LiOH, was mixed and ground by conventional ball milling techniques. A considerable amount of hydrogen generation was noted during the milling process (by an audible gas release when opening the milling vessel). The milled mixture was then analyzed by a modified Sievert's apparatus as shown in FIG. 3. As can be observed from the data, hydrogen generation begins at approximately 40° C. (point A) and is complete at approximately 100° C. (point B). Approximately 0.8 wt. % of hydrogen was generated, which is less than the theoretical yield of 4.1 wt. %, however as noted above, a large unquantified amount of hydrogen was produced during milling, which would likely approach the theoretical yield when accounted for.

EXAMPLE 5

Figure 4:
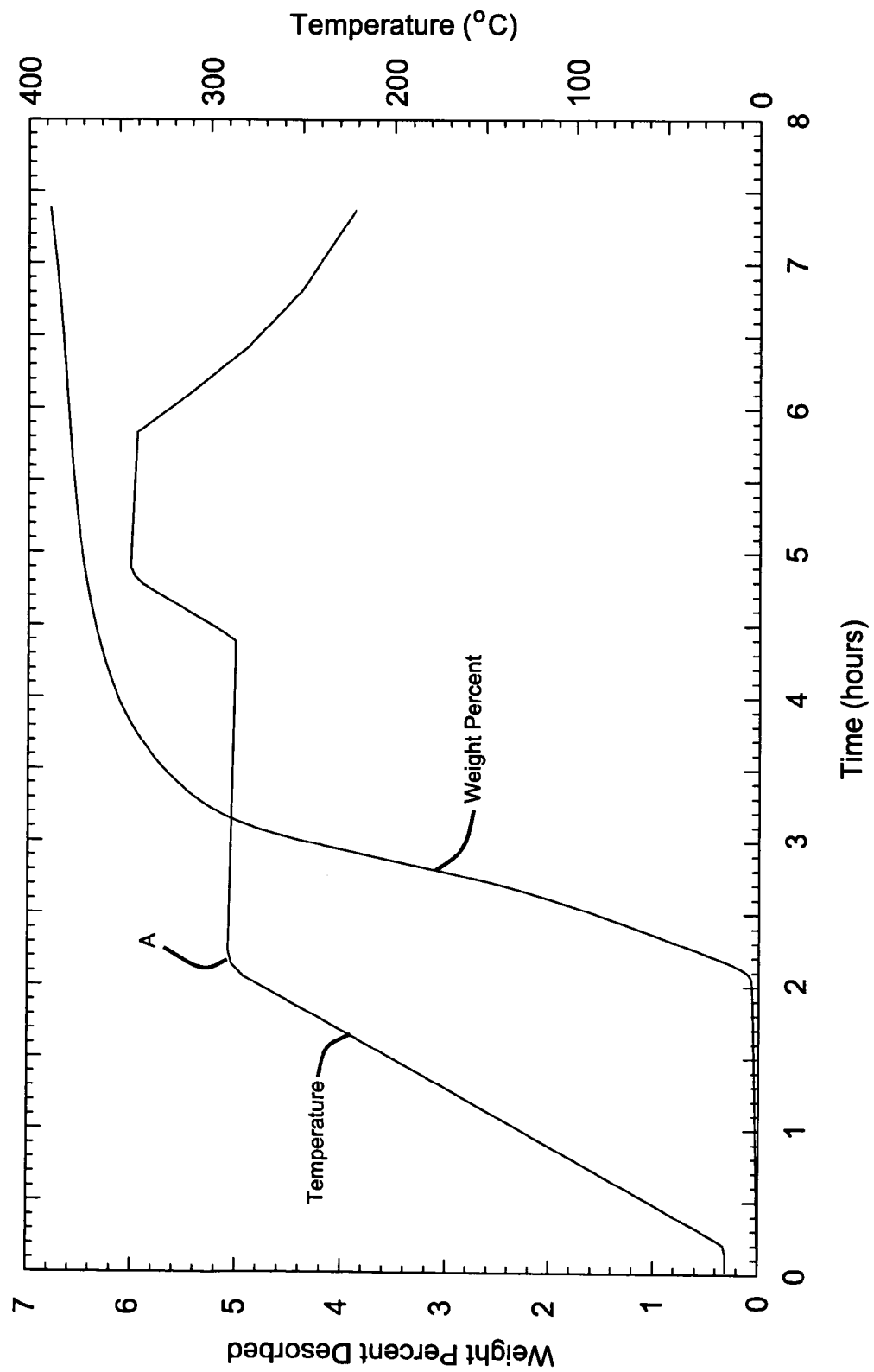
FIG. 4 is a graph showing hydrogen production over time for a hydrogen storage material comprising a complex hydride of lithium boroydride and lithium hydroxide from a modified Sievert's apparatus analysis.

A mixed cation hydrogen storage material system where the hydride is a complex hydride (i.e., lithium borohydride where MI is selected to be lithium) and a hydroxide where MII is selected to the lithium forming lithium hydroxide. An equal molar ratio of lithium borohydride (LiBH$_4$) and lithium hydroxide (LiOH) weighed as 0.224 g LiBH$_4$ and 0.981 g of LiOH, was mixed and then milled for 1 hour. The sample of Example 5 was analyzed by a modified Sievert's analysis as the results shown in FIG. 4. Hydrogen generation appears to commence at approximately 250° C., however, with addition of a catalyst (such as in Example 3), the reaction kinetics should be modified to produce hydrogen at lower temperatures. A maximum of 6.6 wt. % hydrogen was produced, which is close to the theoretical yield of 6.8 wt. %.

In accordance with the behavior observed during the Sievert's testing of the hydrogen storage material systems, it is preferred that the hydrogen production reaction between the hydroxide compositions and hydride compositions is conducted at an elevated temperature above ambient conditions, primarily to increase the rate of reaction, as well as overcoming any initiation activation barriers. Although this specific temperature varies for the thermodynamics of the particular reaction, which is dependent upon the cationic species selected, certain preferred embodiments of the present invention conduct a reaction at a temperature of above about 40° C. Other preferred embodiments of the present invention preferably are conducted at a temperature of about 80° C. or higher.

Additionally, a compressive force may be applied on the solid starting materials while conducting the hydrogen production reaction of the present invention to increase physical contact between the particles and to enhance the reaction. However, in such an embodiment where compressive force is applied to the starting materials, it is preferred that the compressive force is applied in such a manner so as not to prevent hydrogen gas formation or release. For example, the compressive force may be applied with platens formed of porous material, which permits gas to travel therethrough, as it is generated within the starting materials.

The present invention is particularly useful in circumstances where it is employed on a mobile unit as a power device, such as on a vehicle or as an electrochemical cell for an electronic device. The present invention is also well suited for stationary applications, such as generators or in various stationary and mobile military applications, for example. Thus, the present invention provides a power device for use in any application that requires a power generating device. The power device of the present invention comprises a fuel cell that uses hydrogen as a fuel, and further has a storage unit containing hydrogen storage material, which provides hydrogen as fuel to the fuel cell. It is preferred that the hydrogen storage material has hydrogenated state and a dehydrogenated state, where the hydrogenated state of the storage material comprises a hydroxide having a cationic species other than hydrogen, and a hydride. The dehydrogenated state of the storage material preferably comprises an oxide. Further, it is preferred that the power device itself has a filler passage associated with the storage material and it is preferred that the filler passage supplies hydrogen to the dehydrogenated storage material.

In certain applications, the selection of the hydrogen storage material may permit regeneration of the storage material at the power device (i.e., on-board the power device) from a dehydrogenated state to a hydrogenated state by exposing the dehydrogenated material to hydrogen. In such an application, the hydrogen would preferably be delivered at an elevated temperature and pressure above ambient conditions to the storage material in the storage unit via the filler conduit, as recognized by one of skill in the art. In other applications, the storage unit may be removed from the power device and the dehydrogenated material can be regenerated to the hydrogenated material offsite at another processing location. In such an application, the filler passage may likewise be used to deliver necessary reactants to the storage material contained inside the transportable and removable storage unit. The storage material compositions generally dictate whether on-board regeneration is feasible, based on the ease of reversibility and ability to recharge the storage material at the point of use.

Thus, the hydrogen storage materials according to the present invention provide solid phase storage of hydrogen, which is especially advantageous in fuel cell applications, and most especially in mobile fuel cell applications. Such hydrogen storage material compositions generally comprise widely available materials, many of which have a desirably low molecular weight, that facilitates improving the efficiency of the fuel cell unit. Additionally, the system of hydrogen production reactions available from the variants of the present invention have relatively low total enthalpy changes, which reduces the need for extensive control and heat transfer systems, as well as eliminating parasitic energy demands from the fuel-cell and power device systems. Further the release of hydrogen from the hydrogen storage material systems are readily controlled by temperature, pressure, and hydrogen concentrations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of producing hydrogen comprising:
conducting a reaction between a hydride composition and a dehydrated hydroxide composition to form hydrogen and an oxide composition, wherein said hydroxide composition is represented by the formula: $MI^{y}(OH)_y$, where MII represents one or more cationic species other than hydrogen and is selected from the group consisting of Al, As, Ba, Be, Ca, Cd, Ce, Cs, Cu, Eu, Fe, Ga, Gd, Ge, Hf, Hg, In, La, Li, Mg, Mn, Na, Nd, Ni, Pb, Pr, Rb, Sb, Sc, Se, Si, Sm, Sn, Sr, Th, Ti, Tl, V, W, Y, Yb, Zn, Zr, and mixtures thereof and y represents an average valence state of MII.

2. The method according to claim 1 wherein said hydride composition has one or more cationic species other than hydrogen.

3. The method according to claim 2 wherein said oxide composition comprises at least one of said one or more cations other than hydrogen derived from either of said hydride or said hydroxide compositions, respectively.

4. The method according to claim 1 wherein said hydride composition is represented by the formula: $MI^{x}H_x$, where MI represents said one or more cationic species other than hydrogen and x represents an average valence state of MI.

5. The method of claim 1 wherein said hydride composition is represented by $MI^{x}H_x$, where MI represents one or more cationic species other than hydrogen, and x represents an average valence state of MI.

6. The method of claim 5 wherein MI and MII are different cationic species.

7. The method claim 5 wherein MI and MII are the same cationic species.

8. The method of claim 5 wherein MI is a complex cationic species comprising two distinct cationic species.

9. The method of claim 5 wherein MII is a complex cationic species comprising two distinct cationic species.

10. of claim 5 wherein MI is selected from the group consisting of Al, As, B, Ba, Be, Ca, Cd, Ce, Cs, Cu, Eu, Fe, Ga, Gd, Ge, Hf, Hg, In, K, La, Li, Mg, Mn, Na, Nd, Ni, Pb, Pr, Rb, Sb, Sc, Se, Si, Sm, Sn, Sr, Th, Ti, Tl, V, W, Y, Yb, Zn, Zr, and mixtures thereof.

11. The method of claim 5 wherein MI and MII are each elements independently selected from the group consisting of Al, Ba, Be, Ca, Cs, Li, Mg, Na, Rb, Si, Sr, Ti, V and mixtures thereof.

12. The method of claim 11 wherein MI and MII are each elements independently selected from the group consisting of Al, Be, Ca, Li, Mg, Na, Sr, Ti, and mixtures thereof.

13. The method according to claim 1 wherein said hydride composition is selected from the group consisting of: lithium hydride (LiH), sodium hydride (NaH), potassium hydride (KH), beryllium hydride ($BeH_2$), magnesium hydride ($MgH_2$), calcium hydride ($CaH_2$), strontium hydride ($SrH_2$), titanium hydride ($TiH_2$), aluminum hydride ($AlH_3$), boron hydride ($BH_3$), lithium borohydride ($LiBH_4$), sodium borohydride ($NaBH_4$), magnesium borohydride ($Mg(BH_4)_2$), calcium borohydride ($Ca(BH_4)_2$), lithium alanate ($LiAlH_4$), sodium alanate ($NaAlH_4$), magnesium alanate ($Mg(AlH_4)_2$), calcium alanate ($Ca(AlH_4)_2$), and mixtures thereof.

14. The method according to claim 1 wherein said hydroxide composition is selected from the group consisting of: lithium hydroxide (LiOH), sodium hydroxide (NaOH), beryllium hydroxide ($Be(OH)_2$), magnesium hydroxide ($Mg(OH)_2$), calcium hydroxide ($Ca(OH)_2$), strontium hydroxide ($Sr(OH)_2$), titanium hydroxide ($Ti(OH)_2$), aluminum hydroxide ($Al(OH)_3$), and mixtures thereof.

15. The method according to claim 1 wherein said hydride composition comprises LiH and said hydroxide composition comprises LiOH.

16. The method according to claim 15 wherein said reaction proceeds according to a reaction mechanism of $LiH+LiOH \rightarrow Li_2O+H_2$.

17. The method according to claim 1 wherein said hydride composition comprises NaH and said hydroxide composition comprises LiOH.

18. The method according to claim 17 wherein said reaction proceeds according to a reaction mechanism of $NaH+LiOH \rightarrow \frac{1}{2} Li_2O + \frac{1}{2} Na_2O + H_2$.

19. The method according to claim 1 wherein said hydride composition comprises $MgH_2$ and said hydroxide composition comprises $Mg(OH)_2$.

20. The method according to claim 19 wherein said reaction proceeds according to a reaction mechanism of $MgH_2 + Mg(OH)_2 \rightarrow MgO + 2 H_2$.

21. The method according to claim 1 wherein said hydride composition comprises $AlH_3$ and said hydroxide composition comprises $Al(OH)_3$.

22. The method according to claim 21 wherein said reaction proceeds according to a reaction mechanism of $AlH_3 + Al(OH)_3 \rightarrow Al_2O_3 + 3H_2$.

23. The method according to claim 1 wherein said hydride composition comprises $CaH_2$ and said hydroxide composition comprises $Ca(OH)_2$.

24. The method according to claim 23 wherein said reaction proceeds according to a reaction mechanism of $CaH_2 + Ca(OH)_2 \rightarrow CaO + 2 H_2$.

25. The method according to claim 1 wherein said hydride composition comprises $SrH_2$ and said hydroxide composition comprises $Sr(OH)_2$.

26. The method according to claim 25 wherein said reaction proceeds according to a reaction mechanism of $SrH_2 + Sr(OH)_2 \rightarrow SrO + 2 H_2$.

27. The method according to claim 1 wherein said hydride composition comprises $BeH_2$ and said hydroxide composition comprises $Be(OH)_2$.

28. The method according to claim 27 wherein said reaction proceeds according to a reaction mechanism of $BeH_2 + Be(OH)_2 \rightarrow BeO + 2 H_2$.

29. The method according to claim 1 where said hydride composition comprises $LiBH_4$ and said hydroxide composition comprises LiOH.

30. The method according to claim 29 where said reaction proceeds according to a reaction mechanism of $LiBH_4 + 4LiOH \rightarrow LiBO_2 + 2Li_2O + 4H_2$.

31. The method according to claim 1 where said hydride composition comprises $NaBH_4$ and said hydroxide composition comprises $Mg(OH)_2$.

32. The method according to claim 31 where said reaction proceeds according to a reaction mechanism of $NaBH_4 + 2 Mg(OH)_2 \rightarrow NaBO_2 + 2MgO + 4H_2$.

33. The method according to claim 1 where said hydride composition comprises $NaBH_4$ and said hydroxide composition comprises NaOH.

34. The method according to claim 33 where said reaction proceeds according to a reaction mechanism of $NaBH_4 + 4NaOH \rightarrow NaBO_2 + 2Na_2O + 4H_2$.

35. The method according to claim 1 wherein said reaction is reversible to form a species of said hydride composition or said hydroxide composition.

36. The method according to claim 35 wherein said reversible reaction is conducted by exposing said oxide composition to hydrogen to form said species.

37. The method according to claim 36 wherein said reversible reaction regenerates said hydride composition and said hydroxide composition.

38. The method according to claim 1 wherein said reaction is conducted at an elevated temperature relative to ambient conditions.

39. The method according to claim 38 wherein said reaction is conducted at a temperature 40° C. or greater.

40. The method according to claim 1 wherein said hydride composition and said hydroxide composition are in particle form and said reaction is a solid-state reaction.

41. The method according to claim 40 wherein said hydride composition and said hydroxide composition are reduced in particle size prior to said reaction.

42. The method according to claim 1 wherein before conducting said reaction, said hydride composition and said hydroxide composition are essentially homogeneously mixed together.

43. The method according to claim 1 wherein during said reaction, said oxide composition, said hydrogen, or both, are removed from said hydride composition and said hydroxide composition, as said reaction proceeds.

44. The method according to claim 1 wherein during said reaction said hydrogen is removed as said reaction proceeds.

45. The method according to claim 1 wherein said reaction is conducted in the presence of a catalyst in contact with said hydride composition and said hydroxide composition.

46. The method according to claim 45 wherein said catalyst comprises a compound comprising an element selected from the group consisting of Ti, V, Cr, C, Fe, Mn, Ni, Nb, Pd, Si, Al, and mixtures thereof.

47. A method for releasing hydrogen from hydrogen storage materials comprising:
mixing a first hydrogen storage material with a second hydrogen storage material, where said first hydrogen storage material comprises a hydride composition represented by $MI^xH^x$ and said second hydrogen storage material comprises a dehydrated hydroxide composition represented by MI$^x$'(OH)$_y$, where MI and MII each represent a cationic species or a mixture of cationic species other than hydrogen, where MII is selected from the group consisting of Al, As, Ba, Be, Ca, Cd, Ce, Cs, Cu, Eu, Fe, Ga, Gd, Ge, Hf, Hg, In, La, Li, Mg, Mn, Na, Nd, Ni, Pb, Pr, Rb, Sb, Sc, Se, Si, Sm, Sn, Sr, Th, Ti, Tl, V, W, Y, Yb, Zn, Zr, and mixtures thereof, and where x and y represent average valence states of respectively MI and MII; and conducting a reaction between said first storage material with said second storage material for a time and at a temperature sufficient to produce a reaction product comprising an oxide material and hydrogen.

48. The method of claim 47 wherein MI and MII are different cationic species.

49. The method of claim 47 wherein MI and MII are the same cationic species.

50. The method of claim 47 wherein MI is a complex cationic species comprising two distinct cationic species.

51. The method of claim 47 wherein MII is a complex cationic species comprising two distinct cationic species.

52. The method of claim 47 wherein MII is selected from the group consisting of OH$_3$, C$_2$H$_5$, C$_3$H$_7$, Al, As, Ba, Be, Ca, Cd, Ce, Cs, Cu, Eu, Fe, Ga, Gd, Ge, Hf, Hg, In, La, Li, Mg, Mn, Na, Nd, Ni, Pb, Pr, Rb, Sb, Sc, Se, Si, Sm, Sn, Sr, Th, Ti, Tl, V, W, Y, Yb, Zn, Zr, and mixtures thereof.

53. The method of claim 52 wherein MI and MII are each elements independently selected from the group consisting of Al, Ba, Be, Ca, Cs, Li, Mg, Na, Rb, Si, Sr, Ti, V and mixtures thereof.

54. The method of claim 53 wherein MI and MII are each elements independently selected from the group consisting of Al, Be, Ca, Li, Mg, Na, Sr, Ti, and mixtures thereof.

55. The method according to claim 47 wherein said hydride composition is selected from the group consisting of: lithium hydride (LiH), sodium hydride (NaH), potassium hydride (KH), beryllium hydride (BeH$_2$), magnesium hydride (MgH$_2$), calcium hydride (CaH$_2$), strontium hydride (SrH$_2$), titanium hydride (TiH$_2$), aluminum hydride (AlH$_3$), boron hydride (BH$_3$), lithium borohydride (LiBH$_4$), sodium borohydride (NaBH$_4$), magnesium borohydride (Mg(BH$_4$)$_2$), calcium borohydride (Ca(BH$_4$)$_2$), lithium alanate (LiAlH$_4$), sodium alanate (NaAlH$_4$), magnesium alanate (Mg(AlH$_4$)$_2$), calcium alanate (Ca(AlH$_4$)$_2$), and mixtures thereof.

56. The method according to claim 47 wherein said hydroxide composition is selected from the group consisting of: lithium hydroxide (LiOH), sodium hydroxide (NaOH), beryllium hydroxide (Be(OH)$_2$), magnesium hydroxide (Mg(OH)$_2$), calcium hydroxide (Ca(OH)$_2$), strontium hydroxide (Sr(OH)$_2$), titanium hydroxide (Ti(OH)$_2$), aluminum hydroxide (Al(OH)$_3$), and mixtures thereof.

57. The method according to claim 47 wherein said hydride composition comprises LiH and said hydroxide composition comprises LiOH.

58. The method according to claim 57 wherein said reaction proceeds according to a reaction mechanism of LiH+LiOH→Li$_2$O+H$_2$.

59. The method according to claim 47 wherein said hydride composition comprises NaH and said hydroxide composition comprises LiOH.

60. The method according to claim 59 wherein said reaction proceeds according to a reaction mechanism of NaH+LiOH→½ Li$_2$O+½ Na$_2$O+H$_2$.

61. The method according to claim 47 wherein said reaction is reversed by exposing said oxide material to hydrogen to form a regenerated first storage material comprising a hydride and a regenerated second storage material comprising a hydroxide.

62. The method according to claim 61 wherein said hydride of said regenerated first storage material and said hydroxide of said regenerated second storage material are the same species as said first and said second starting materials, comprising said hydride and said hydroxide, respectively.

63. The method according to claim 47 wherein said reaction is conducted at an elevated temperature relative to ambient conditions.

64. The method according to claim 63 wherein said reaction is conducted at a temperature of 40° C. or greater.

65. The method according to claim 47 wherein said first starting material and said second starting material are in particle form and said reaction is a solid state reaction.

66. The method according to claim 65 wherein said first starting material and said second starting material are reduced in particle size prior to said reaction.

67. The method according to claim 47 wherein before conducting said reaction, said first starting material and said second starting material are essentially homogeneously mixed together.

68. The method according to claim 47 wherein during said reaction, said oxide, said hydrogen, or both, are removed from said first starting material and said second starting material, as said reaction proceeds.

69. The method according to claim 47 wherein during said reaction said hydrogen is a removed from said first and said second starting materials as said reaction proceeds.

70. The method according to claim 47 wherein said reaction is conducted in the presence of a catalyst in contact with said first starting material and said second starting material.

71. The method according to claim 70 wherein said catalyst comprises a compound comprising an element selected from the group consisting of Ti, V, Cr, C, Fe, Mn, Ni, Nb, Pd, Si, Al, and mixtures thereof.

72. A method of producing a source of hydrogen gas comprising:

liberating hydrogen from a solid hydrogenated starting material composition comprising a hydride and a dehydrated hydroxide selected from the group consisting of: lithium hydroxide (LiOH), sodium hydroxide (NaOH), beryllium hydroxide (Be(OH)$_2$), magnesium hydroxide (Mg(OH)$_2$), calcium hydroxide (Ca(OH)$_2$), strontium hydroxide (Sr(OH)$_2$), titanium hydroxide (Ti(OH)$_2$), aluminum hydroxide (Al(OH)$_3$ and mixtures thereof, by reacting said hydride and said dehydrated hydroxide in a solid state reaction to produce a dehydrogenated reaction product and hydrogen gas.

73. The method according to claim 72 wherein said hydride and said hydroxide each have one or more cationic species other than hydrogen.

74. The method according to claim 72 further comprising regenerating said hydrogenated starting material composition by exposing said dehydrogenated product to hydrogen gas.

75. The method of claim 72 wherein said dehydrogenated product comprises an oxide.

76. The method of claim 74 wherein said regenerating is conducted at an elevated temperature relative to ambient conditions.

77. The method of claim 76 wherein said liberating of hydrogen is conducted at an elevated temperature greater than about 40° C.

78. The method of claim 72 wherein said liberating is conducted by removing said hydrogen gas as said reacting proceeds.

79. The method of claim 72 wherein said liberating is conducted in the presence of a catalyst in contact with said starting material composition.

80. The method according to claim 79 wherein said catalyst comprises a compound comprising an element selected from the group consisting of Ti, V, Cr, C, Fe, Mn, Ni, Nb, Pd, Si, Al, and mixtures thereof.

81. A hydrogen storage composition having a hydrogenated state and a dehydrogenated state:
  (a) in said hydrogenated state, said composition comprises a hydride represented by $MI^xH_x$ and a dehydrated hydroxide represented by $MII^y(OH)_y$, where MI and MII respectively represent one or more cationic species other than hydrogen that are selected from the group consisting of Al, As, Ba, Be, Ca, Cd, Ce, Cs, Cu, Eu, Fe, Ga, Gd, Ge, Hf, Hg, In, La, Li, Mg, Mn, Na, Nd, Ni, Pb, Pr, Rb, Sb, Sc, Se, Si, Sm, Sn, Sr, Th, Ti, Tl, V, W, Y, Yb, Zn, Zr, and mixtures thereof, wherein at least one of MI or MII is a complex cationic species comprising two distinct cationic species and x and y represent average valence states of MI and MII, respectively; and
  (b) in said dehydrogenated state, said composition comprises an oxide.

82. The composition of claim 81 wherein MI is said complex cationic species.

83. The composition of claim 81 wherein MII is a said complex cationic species.

84. The composition of claim 81 wherein MII is selected from the group consisting of Al, As, Ba, Be, Ca, Cd, Ce, Cs, Cu, Eu, Fe, Ga, Gd, Ge, Hf, Hg, In, La, Li, Mg, Mn, Na, Nd, Ni, Pb, Pr, Rb, Sb, Sc, Se, Si, Sm, Sn, Sr, Th, Ti, Tl, V, W, Y, Yb, Zn, Zr, and mixtures thereof.

85. The composition of claim 84 wherein MI and MII is selected from the group consisting of Al, Ba, Be, Ca, Cs, Li, Mg, Na, Rb, Si, Sr, Ti, V and mixtures thereof.

86. The composition of claim 85 wherein MI or MII is selected from the group consisting of Al, Be, Ca, Li, Mg, Na, Sr, Ti, and mixtures thereof.

87. The composition of claim 81 wherein said hydride is selected from the group consisting of: lithium hydride (LiH), sodium hydride (NaH), potassium hydride (KH), beryllium hydride ($BeH_2$), magnesium hydride ($MgH_2$), calcium hydride ($CaH_2$), strontium hydride ($SrH_2$), titanium hydride ($TiH_2$), aluminum hydride ($AlH_3$), boron hydride ($BH_3$), lithium borohydride ($LiBH_4$), sodium borohydride ($NaBH_4$), magnesium borohydride ($Mg(BH_4)_2$), calcium borohydride ($Ca(BH_4)_2$), lithium alanate ($LiAlH_4$), sodium alanate ($NaAlH_4$), magnesium alanate ($Mg(AlH_4)_2$), calcium alanate ($Ca(AlH_4)_2$), and mixtures thereof.

88. The composition of claim 81 wherein said hydroxide is selected from the group consisting of: lithium hydroxide (LiOH), sodium hydroxide (NaOH), beryllium hydroxide ($Be(OH)_2$), magnesium hydroxide ($Mg(OH)_2$), calcium hydroxide ($Ca(OH)_2$), strontium hydroxide ($Sr(OH)_2$), titanium hydroxide ($Ti(OH)_2$), aluminum hydroxide ($Al(OH)_3$), and mixtures thereof.

89. The composition of claim 81 wherein said hydride comprises LiH.

90. The composition of claim 81 wherein said hydroxide comprises LiOH.

91. The composition according to claim 81 where said hydride composition comprises $LiBH_4$ and said hydroxide comprises LiOH.

92. The composition according to claim 91 where said reaction proceeds according to a reaction mechanism of $LiBH_4 4\ LiOH \rightarrow LiBO_2 + 2\ Li_2O + 4H_2$.

93. The composition according to claim 81 where said hydride composition comprises $NaBH_4$ and said hydroxide comprises $Mg(OH)_2$.

94. The composition according to claim 93 where said reaction proceeds according to a reaction mechanism of $NaBH_4 + 2\ Mg(OH)_2 \rightarrow NaBO_2 + 2MgO + 4H_2$.

95. The composition according to claim 81 where said hydride composition comprises $NaBH_4$ and said hydroxide comprises NaOH.

96. The composition according to claim 95 where said reaction proceeds according to a reaction mechanism of $NaBH_4 + 4\ NaOH \rightarrow NaBO_2 + 2\ Na_2O 4\ H_2$.

97. A hydrogen storage composition having a hydrogenated state and a dehydrogenated state:
  (a) in said hydrogenated state, said composition comprises a hydride represented by $MI^xH_x$ and a dehydrated hydroxide represented by $MII^y(OH)_y$, where MI and MII respectively represent one or more cationic species other than hydrogen that are selected from the group consisting of Al, Be, Ca, Mg, Sr, and mixtures thereof, wherein x and y represent average valence states of MI and MII, respectively; and
  (b) in said dehydrogenated state, said composition comprises an oxide.

98. The composition according to claim 97 wherein said hydride composition comprises $MgH_2$ and said hydroxide composition comprises $Mg(OH)_2$.

99. The composition according to claim 98 wherein said reaction proceeds according to a reaction mechanism of $MgH_2 + Mg(OH)_2 \rightarrow MgO + 2\ H_2$.

100. The composition according to claim 97 wherein said hydride composition comprises $AlH_3$ and said hydroxide composition comprises $Al(OH)_3$.

101. The composition according to claim 100 wherein said reaction proceeds according to a reaction mechanism of $AlH_3 + Al(OH)_3 \rightarrow Al_2O_3 + 3H_2$.

102. The composition according to claim 97 wherein said hydride composition comprises $CaH_2$ and said hydroxide composition comprises $Ca(OH)_2$.

103. The composition according to claim 102 wherein said reaction proceeds according to a reaction mechanism of $CaH_2 + Ca(OH)_2 \rightarrow CaO + 2\ H_2$.

104. The composition according to claim 97 wherein said hydride composition comprises $SrH_2$ and said hydroxide composition comprises $Sr(OH)_2$.

105. The composition according to claim 104 wherein said reaction proceeds according to a reaction mechanism of $SrH_2 + Sr(OH)_2 \rightarrow SrO + 2\ H_2$.

106. The composition according to claim 97 wherein said hydride composition comprises $BeH_2$ and said hydroxide composition comprises $Be(OH)_2$.

107. The composition according to claim 106 wherein said reaction proceeds according to a reaction mechanism of $BeH_2 + Be(OH)_2 \rightarrow BeO + 2\ H_2$.

* * * * *